Figure 15:
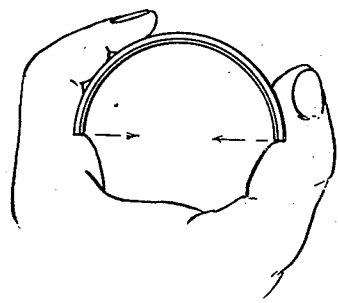

June 21, 1932.    B. F. HOPKINS ET AL    1,863,809
BEARING
Filed Jan. 7, 1932    3 Sheets-Sheet 1
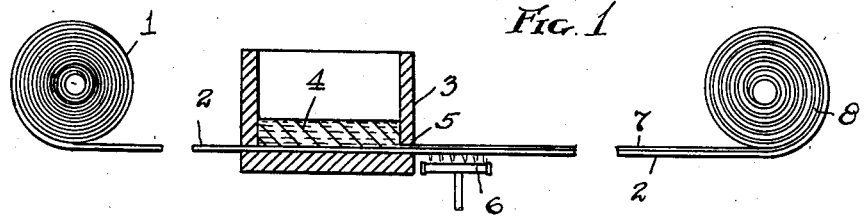
FIG. 1
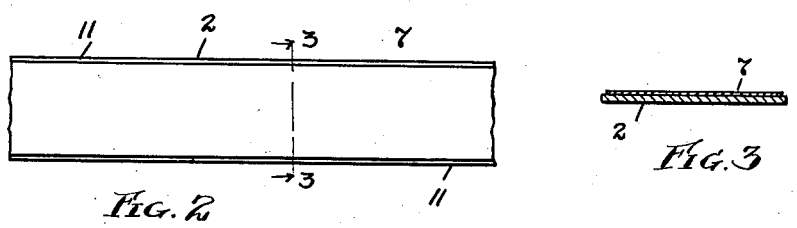
FIG. 2
FIG. 3
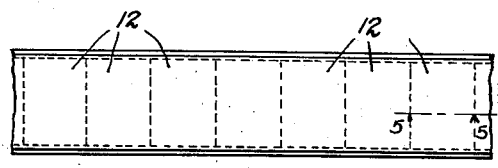
FIG. 4
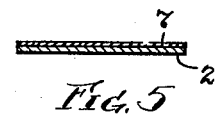
FIG. 5
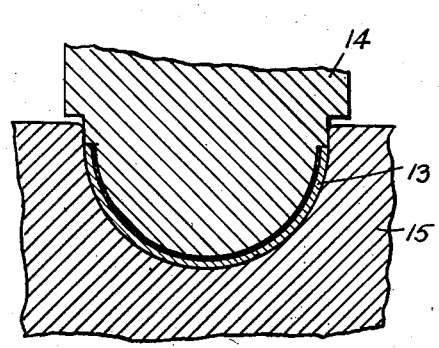
FIG. 6
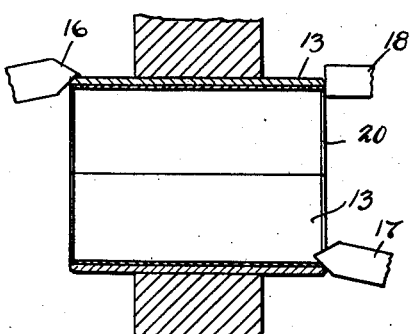
FIG. 7
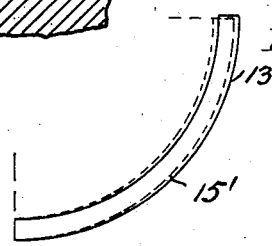
FIG. 6ª
INVENTORS
Benjamin F. Hopkins and
BY    John V. O. Palm.
Fay, Oberlin & Fay
ATTORNEYS

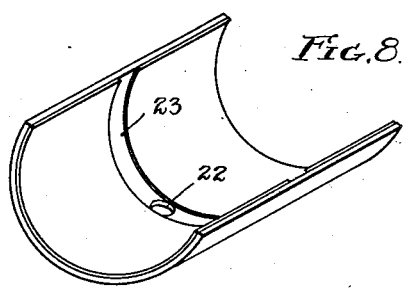
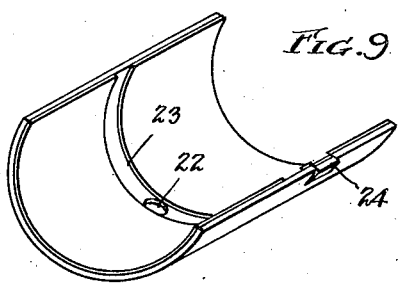
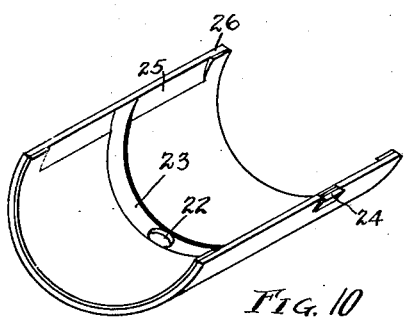
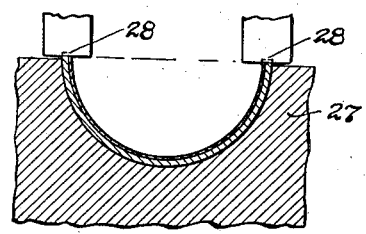
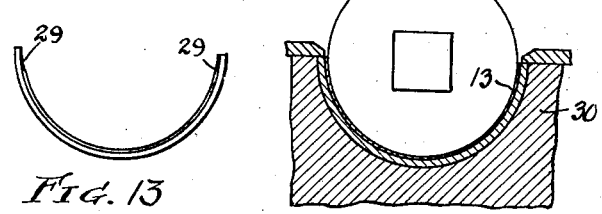
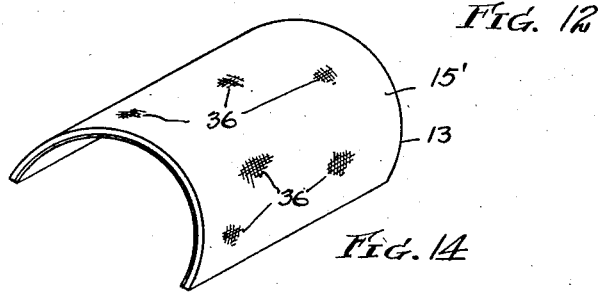

June 21, 1932.  B. F. HOPKINS ET AL  1,863,809
BEARING
Filed Jan. 7, 1932    3 Sheets-Sheet 3

INVENTORS
Benjamin F. Hopkins and
John V. O. Palm.
BY Fay, Oberlin & Fay
ATTORNEYS.

Patented June 21, 1932

1,863,809

UNITED STATES PATENT OFFICE

BENJAMIN F. HOPKINS AND JOHN V. O. PALM, OF CLEVELAND HEIGHTS, OHIO, ASSIGNORS TO THE CLEVELAND GRAPHITE BRONZE COMPANY, OF CLEVELAND, OHIO, A CORPORATION OF OHIO

BEARING

Application filed January 7, 1932. Serial No. 585,341.

The present invention, relating as indicated to bearings, is directed to a new and improved bearing for heavy service, such for example as for the journaling of crank shafts of internal combustion engines, pump shafts and the like, or for connecting rods or similar parts in general machinery, etc., where the stresses on the bearings are long continued or severe. It is the purpose of the present invention to provide a heavy-duty bearing which shall be:

1. Light in weight, of compact, strong, dense, non-porous metal;
2. Capable of being formed or stamped by relatively light, inexpensive, high-speed, sheet metal forming equipment, and when so worked or formed, accurate so that it requires no finishing, machining or grinding operations on its outer surface;
3. Sufficiently flexible or conformable to permit of initial processing for the lining of material with babbitt in continuous coils and in light inexpensive equipment, and of a flexibility permitting the material, both in long lengths and in short blanks to allow of fast and cheap processing during manufacture, affording ease in handling, compactness for nesting and shipping, convenient manual and rapid assembly in the supporting housings, and finally conformability to the wall of such housing under the available cap pressures in order to secure for such light relatively flexible bearing the strength and supporting rigidity of the housing proper while permitting slight motion relative to the housing when necessary in service to accommodate the bearing to varying stresses between the shaft and bearing wall, and
4. Accurate in certain necessary dimensions to limits heretofore impossible of attainment, except by laborious and expensive hand workmanship, the limit in question being primarily that of uniform wall thickness and, to a lesser extent, circumferential length.

In the past heavy-duty bearings have been of five kinds, i. e. (1) babbitt liners cast directly into the housing and cap, (2) die-cast liners cast separately and then fitted into the housing, (3) babbitt lined brass or bronze shells, (4) babbitt lined steel shells, and (5) bronze lined steel backed shells for heavy service with hardened shafts. Little can be said in favor of the first two types enumerated above except that they are relatively cheap and have been satisfactory in the past where the rotative loads and speeds were low. Brass bearings lined with babbitt have been found satisfactory for much heavier loads and speeds than the simple babbitt liners, but are obviously more expensive and require heavy and expensive equipment to manufacture to precision limits. Babbitt lined steel shells possess many advantages over brass shells in strength, and hence are used extremely heavy service, as for example in marine and airplane motors, Diesel engines and the like, but, when held to precision limits, are expensive to manufacture, requiring heavy and expensive machinery, extremely accurate workmanship and in general large plant space. Babbitt lined brass or steel shells as now used are heavy, expensive and rigid, whether formed from castings, drawn tubing, flat stock, or in any other way, and require many costly and difficult operations in processing from the raw material to the finishing article. This is even more true in the case of the bronze-lined steel-backed shells. All of the three last mentioned types possess the advantages referred to over the old babbitt liners, but their manufacture and use involves many difficulties and disadvantages, some of which are mentioned above, while others will be referred to at appropriate points herein by way of comparison with our improved bearings now to be described.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

Figure 16:
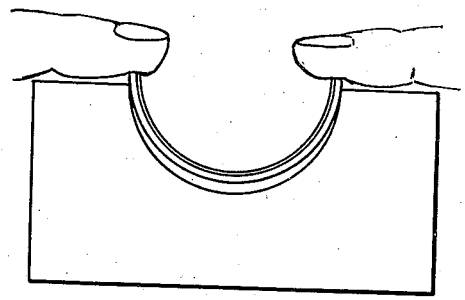
Figure 17:
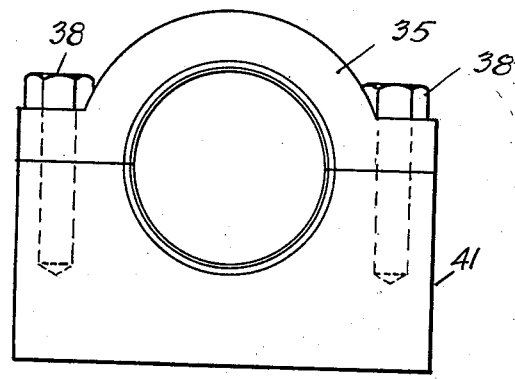
Figure 18:
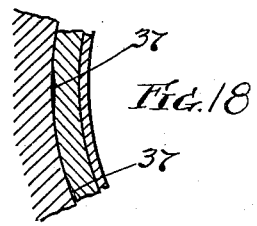
Figure 19:
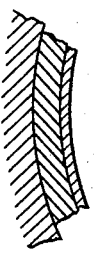
Figure 20:
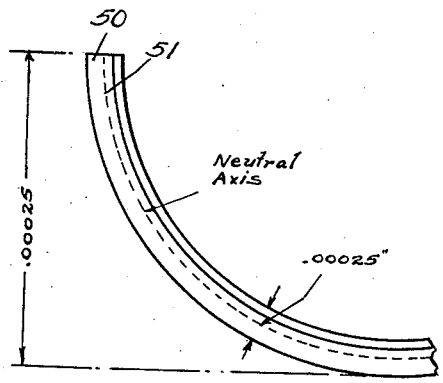
Figure 21:
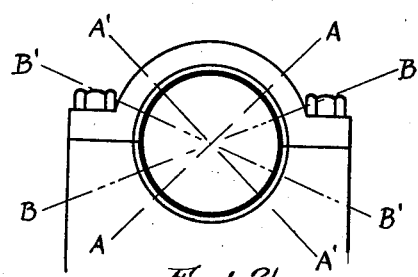

In said annexed drawings:

Fig. 1 is a side elevation partially in section and diagrammatic in character illustrating one method of applying a liner or facing of bearing material to a sheet of supporting metal; Fig. 2 is a plan view of a lined composite metal strip; Fig. 3 is a section on the line 3—3 in Fig. 2; Fig. 4 is a plan view of the composite strip cut into rectangular blanks; Fig. 5 is a section on the line 5—5 of Fig. 4; Fig. 6 is a transverse central section illustrating diagrammatically the method of forming, coin pressing and upsetting the rectangular blank into a semi-cylindrical bearing shell; Fig. 6A is a partial end elevation illustrating diagrammatically the enlargement or spread given to the shell produced in the operation of Fig. 6 with respect to the size to which the shell is compressed upon assembly into a housing; Fig. 7 is a central section, diagrammatic in character, illustrating the method of chamfering the end edges of two half shells; Fig. 8 is a view in perspective of a shell provided with a lubricant opening and a lubricant distributing groove; Fig. 9 is a similar view of the same shell after being provided with the notch or dowel in one edge; Fig. 10 is a similar view showing the same shell provided with dirt receiving pockets; Fig. 11 is a central section, diagrammatic in character, illustrating the operation of shaving the parting line edges of the shell; Fig. 12 is a similar view, diagrammatic in character, illustrating the operation of broaching or finishing the inside or bearing surface of the shell to its final finished dimension; Fig. 13 is a side elevation showing the broached shell with a certain predetermined relief given to the shell adjacent the parting line edges; Fig. 14 is a view in perspective showing the outer surface of our bearing and illustrating in an exaggerated manner the irregularities in the contour thereof; Fig. 15 is a view in perspective illustrating the manual flexibility of the finished half bearing; Fig. 16 is an end elevation, diagrammatic in character, illustrating the method of assembly and the ease of assembly by reason of the manual flexibility of the bearing; Fig. 17 is an end elevation showing two of our half bearings assembled in a housing; Fig. 18 is a fragmentary transverse section illustrating the initial contact or engagement between the outer surface of the bearing and the inner surface of the housing wall; Fig. 19 is a similar view illustrating the engagement between bearing surface and housing wall after complete assembly; Fig. 20 is a partial end elevation of one of our shells illustrating the limits and shape thereof; and Fig. 21 is an end elevation of two of our bearings assembled in a housing with the planes of maximum stress both on the bearing surface and the outer wall illustrated by the dotted lines.

In the development of the present bearing applicants have sought to make a bearing which would have vital advantages in low cost, inexpensive raw material, easy and rapid manufacturing, in light, inexpensive, fast operating equipment, convenience in manufacturing, handling, shipping and assembly, extreme accuracy of dimensions with a minimum of precision operations as compared with processes employed heretofore, and conformability to the housings in which the bearings are to be used in order to secure the supporting strength of the housing by using a minimum of material in the bearing, instead of securing bearing rigidity by the thickness and inherent strength of the bearing itself as in the past. Upon completing the development of a bearing having the above advantages applicants find that the ideal bearing possessing these characteristics is one formed of dense, compact, light sheet metal, such as steel, of a thickness which permits the material to be processed continuously in coils without the use of excessively heavy or large size equipment, and of such a thickness as to permit it to be readily formed in light equipment and which possesses, both from the forming of the strip and partly from the operations involved in forming the strip blank into semi-cylindrical bearing shells, an extreme accuracy and uniformity in the rear or supporting wall of the shell of such precision that no further operations, such as machining, grinding, or the like, are necessary; in short, a precision bearing as regards its rear or supporting wall so secured by applicants from the material selected and the operations involved in the forming of this material, as will be hereinafter outlined. Other characteristics which our bearings possess are extreme precision of total wall thickness over the entire area of the bearing and a certain degree of flexibility, the uses and advantages of which will appear more fully hereinafter.

It will be necessary, in order to explain clearly the characteristics and advantages of our improved bearing, to describe the method of manufacture, although it will be understood that the particular method here explained is not the only method by which our bearing, or bearings, having the characteristics of ours, can be effectively manufactured.

Referring now to the drawings: In Fig. 1 we have shown a coil 1 of relatively thin, flexible, sheet metal 2 of strong, dense, compact structure which has been produced in the form shown by successive rolling operations and which in thin sheets is possessed of fairly close accuracy as regards uniform wall thickness. Ordinarily sheet metal is held in wall thickness to a certain percentage of its total thickness, usually five per cent, and therefore the thinner the material from which our bearings are made the more accurate the thickness of the material. This sheet 2 of thin flexible sheet metal is first heated to the desired temperature and is then passed through a chamber 3 containing molten bearing metal 4, usually babbitt, which flows onto the top of the strip 2 and issues with the strip beneath the edge or gate 5 of the chamber 3, forming, when cooled by any suitable means such as the water spray 6, a composite sheet or strip consisting of the supporting metal or sheet 2 and a liner of the bearing metal of babbitt 7 bonded thereto. The composite strip is still flexible and hence capable of removal and subsequent handling in the form of the coil 8, but before coiling may be gauged to a predetermined thickness by having the surface of the bearing material machined if desired, this operation being best carried out by tensioning the strip between a brake and a pair of pulling rolls and machining the coated surface of the strip in this tensioned condition.

The particular advantages of employing relatively thin sheet stock carry through all of the operations already described. The stock is initially more accurate in thickness as already explained, it requires less time for thorough heating, it can be held flatter when passing through the babbitting chamber, thus rendering it more easily possible to prevent babbitt from flowing around the edges and onto the back of the strip, and it can be more readily tensioned than can thick heavy stock and with less power in the tensioning rolls, and it can also be handled in coils instead of strips or sheets.

In our method we block off the edge portions 11 of the sheet 2, so that no babbitt is applied to this portion, giving a strip of the type shown in Figs. 2 and 3. The strip is then cut into rectangular blanks 12 (see Fig. 4) from the fully coated portion of the sheet, giving a blank of the cross-section shown in Fig. 5. The rectangular blanks thus formed are next formed or pressed into semi-cylindrical shells 13 between dies 14 and 5 (see Fig. 6) and are in a single complete operation, or in two successive steps in the same dies, formed or stamped to the approximate final cross-section described and are also coin-pressed and upset, as will be evident from the nature of the dies shown in Fig. 6.

The shell 13 formed in the operation of Fig. 6 is formed to a diameter greater than that of the housing in which the shell is later to be assembled by an amount which will vary under different conditions, but is represented by the distance between the full and dotted lines in Fig. 6A. This excess diameter, which is hereinafter referred to as the "spread" of the bearing, is of material advantage as will be explained.

The semi-cylindrical shell formed by the operation of Fig. 6 has an extremely smooth uniform accurate back 15' and uniform thickness both of the supporting sheet 2 and of the babbitt lining 7. Any inaccuracies in outer wall contour are removed in the upsetting to which the bearing is subjected as a part of this forming or stamping operation. The bearing is coin-pressed and upset to exact predetermined outer contour and approximate desired circumferential length, the bearing being given the desired spread and being made still more uniform and smooth than was the surface already from the previous operations. It will be remembered that the half-shell formed upon completion of the coin-pressing operation has an outer surface which has been subjected to various rolling operations during its manufacture, to the pressure of the rolls during the milling operation upon the babbitt already referred to, to the pressure of the dies in the blanking operation, and to the heavy upsetting pressure involved in the operation of coin-pressing the half-shell. As a result of this processing the outer surface of the supporting layer of the shell is brought to extremely accurate limits, making it unnecessary to apply any further finishing operation to this surface in order to secure the quite remarkable limits of precision which are desired in this type of article.

After the desired coin-pressing and upsetting operation, the shells are chamfered in the manner shown in Fig. 7, which involves the chucking of two half-shells 13 and the machining of the end edges 20 either successively or simultaneously, as may be desired, by tools 16, 17 and 18 which operate respectively upon the outer, inner and flat portions of the edges to produce a rounded edge contour. Three tools are ordinarily employed to produce this contour at each edge, but we have illustrated only one each of the tools in Fig. 7.

Each half shell may next be provided with a lubricant hole 22 which may be either drilled or punched and with a lubricant distributing groove 23 which also may either be milled or stamped. These lubricant channels are shown in Figs. 8, 9 and 10. The shell is next provided with a stamped out notch or lug 24 (see Fig. 9) which serves as a stop or dowel and is intended to engage on a correspondingly formed recess in the cap or housing in which the shell is subsequently assembled. The shell is next provided with a recessed portion 25 adjacent each parting line edge 26, this recess portion serving as a dirt receiving pocket. The shells are next subjected to a shaving operation, illustrated in Fig. 11, in which the shell is mounted in a suitable die block 27 of the size of the housing in which the bearing is to be assembled, and clamped, and its parting line edges 28 removed to a desired predetermined circumferential length of the shell.

In order to avoid any possibility of inward movement of the parting line edges of the bearing when assembled in the manner to be later described which might result in a pinching of the shaft at this point, the edge of the bearing is relieved, as indicated in Fig. 13, at the point 29 for a short distance adjacent each parting line edge. This relief is extremely small and is ordinarily the last of the operations performed in the manufacture of the bearing. Before the cutting of this relief the shell 13 is broached to its final inside dimension by mounting in a fixture 30 having an inside size identical with that of the housing in which the bearing is to be assembled. The shell so mounted is then machined on its inner surface by drawing longitudinally of the shell a broach 31 which removes stock, leaving the bearing the predetermined total wall thickness. It is only possible to secure the extremely accurate total wall thickness which is desired by a very accurate broaching operation and the lightness and flexibility of the shell requires less power to clamp or press the bearing in a fixture, minimizes die wear and allows the use of less expensive die steel and less expensive treatment of the steel.

The bearings as finally formed ready for use are shown in Figs. 14, 15, 16, 17 and 18. Each bearing is formed with a certain excess circumferential length, that is, the parting line edges 28 (see Fig. 11) stand above a true diameter, and hence in assembly into a housing in the manner shown in Fig. 17 this excess length, which will vary under different conditions, but will ordinarily be a few thousandths of an inch, must be absorbed in the assembly. The finished shell is also provided with a certain amount of spread, which is indicated in Fig. 6A, this spread varying from a few thousandths of an inch to as much as 35 or 40 thousandths and serving to assist in retaining each half bearing in each half housing, permitting a bearing to be assembled in a cap 35 prior to the assembly of the cap on the housing 41 without danger of the bearing dropping from the cap and with added convenience to the assembly.

The character of surface of the back of each shell is indicated in Fig. 14 and is an extremely smooth accurate surface, but under precision instruments has been found to have certain extremely minute irregularities in the contour 36 in certain cases, due possibly to the unequal pressure or flow of the metal during forming operations. The minute irregularities in the outer surface of the shell, and possibly other similarly minute irregularities in the wall of the housing, prevent an absolutely complete uniform engagement between shell and housing when the shell is first positioned in the housing prior to the bolting down of the cap. Thus when the shell, which is of larger diameter than the housing, is first mounted above the housing in the manner shown in Fig. 16 and is snapped or pressed into place by reason of its manual flexibility by the operator, as indicated, the nature of the contact between shell and housing is believed to be of the character illustrated in Fig. 18 in which we have shown (immensely exaggerated) spaces 37 between these two surfaces at certain points. Upon the assembly of the cap upon the housing with the shells in place in each, as illustrated in Fig. 17, and the final bolting down and complete assembly of cap and housing, the excess length in each shell is absorbed by this assembly and acts to bend or flex the metal of the shell into a complete engagement with the wall of the housing, as illustrated in Fig. 19.

In the aforesaid "final bolting down and complete assembly of cap and housing", it is manifest that only a small portion of the pressure available in the cap bolts 38 should be required to completely seat the bearings in the housing, since the greater portion of the available bolt pressure must be reserved for resistance to the forces which, when the engine is running, tend to spread apart cap and housing,—as a result of the working stresses and loads imposed on the bearings and on the housing by the shafts and reciprocating parts thereof during operation.

Owing to the flexibility and compressibility of our type of bearing, complete engagement with the housing can be secured with less bolt-pressure than is required to completely seat the conventional heavy, stiff bearings. With this lesser pressure, our bearings are compressed circumferentially, their circumferential length decreased, their thickness increased minutely, and the bearings are forced against the housing wall to insure complete overall engagement regardless of the minute contour irregularities referred to. This seating and full contact of the bearing wall in the housing affords the bearing the rigidity and strength of the housing and the stresses and loads imposed upon the bearing, in operation, are immediately transmitted to, and are borne by, the housing.

While the conventional, heavy, thick bearings now in use and the cases and the caps into which they are assembled can be machined within such close limits as to permit the bearings to be assembled in the housing and secure complete overall engagement between the bearing and the housing wall, without requiring excessive bolt-pressure to secure that result, practically, the cost of machining within such limits, on large production, would be prohibitive. It has been our experience that in many cases, these heavy, thick bearings have not been brought into complete overall engagement with the housing or, if they have, an excessive portion of the available bolt-pressure had been consumed.

The conformability of our bearings to the housing, resulting of course from the flexibility of the shells, is believed from numerous tests to be of great importance in certain uses, such for example as in connecting rods where the rod end is of such light section that under stress it yields, allowing the normally circular hole to be distorted to an oval hole. Under such conditions of course the bearings must also yield. As a result of numerous tests of our bearings in such service it has been found that the backs of the bearings show distinct evidence of movement of the bearing with respect to the housing. Obviously with thicker bearings fatigue is more rapidly set up and the bearings have a shorter life, as the stress is proportional to the distance between the surface of the babbitt lining and the neutral axis of the bearing. In the light flexible bearing, this distance is reduced, thereby decreasing the stress due to flexing of the babbitt and the fatigue set up therein, with the result that such bearings in service show a remarkably longer life than bearings of the types heretofore used.

In Fig. 20 we have shown a portion of one of our bearings 50 in which the neutral axis of the supporting metal is indicated at the line 51. The flexing of the babbitt lining in use as well as during the forming of the shell depends upon the distance of the babbitt from the neutral axis of the supporting sheet and we have found that in shells having manual flexibility the babbitt is normally in practically the best condition. The tolerance to which our bearings are made are indicated by the legends on Fig. 20. The total wall thickness can conveniently be held in such bearings to a tolerance of one-fourth of one thousandth of an inch and also to the same tolerance in the parting line height, that is the vertical distance as measured on the figure from the parting line edge of the bottom of the center of the shell. By reason, however, of the flexibility of the shells the latter dimension is of less importance as a slight increase in the circumferential length or parting line height can readily be absorbed when the bearing is fitted into the housing by reason of the decrease in circumferential length due to the compressing of the bearing during this assembling operation.

In Fig. 21 we have shown planes A—A and A'—A' which in the ordinary bearing employed in journalling connecting rods of internal combustion engines are the planes of maximum stress and wear on the inner surface of the bearings depending of course on the direction of rotation of the shaft therein. The planes indicated by the line B—B and B'—B' indicate the planes of maximum movement or wear on the outer surfaces of the bearings in the housings and it has been found under certain conditions that in spite of the compressing of the bearings against the housing wall during assembly there is a certain movement or flexing of the bearings in service, the maximum wear being indicated along the planes B—B and B'—B', depending upon the direction of rotation, and we believe that the advantages and life of our bearings in service are to an extent due to this ability to flex or move in the housing which is a characteristic not possessed by the heavy, thick, rigid bearings heretofore employed.

Our new formed flexible sheet metal bearings possess many advantages over those heretofore used, and produce great economies, both in the manufacture and assembly, as well as in the handling and shipping. It is extremely difficult to separate the various advantageous features and to attribute these directly and solely to any one characteristic of the bearings, and certain of the advantages and economies are derived jointly from several of the new features of these articles. In general, the advantageous results can be more or less directly attributed to the features hereinafter named.

Since the bearings are formed of sheet metal of thin section the cost of the raw material is extremely low, the variation of thickness can be kept to a minimum, the light material can be handled in relatively light equipment and without heavy roll pressures, the stock can be kept flat and thereby the babbitt lining can be made very much more uniform in thickness, and thinner in section, the stock may be handled in coils before and after lining, with less scrap, and for the same weight of a coil of stock many more feet of material are included, and hence longer runs and fewer changes in set-up in manufacture occur.

Our light sheet metal stock permits all of the forming operations to be rapid and, for the same expenditure of power and care, very much more accurate. Light equipment operating at relatively high speeds can be employed throughout, greatly increasing the production from that possible with heavy stock and correspondingly lower cost. By reason of the light thin shells, and the thin layer of babbitt the latter is not stressed during forming operations as it would be with thick shells heavily lined. On the contrary, the original babbitt structure in the lined strip is improved in the present bearings after the lined strip has been formed, etc. As a result there is a marked advantage in the babbitt structure in the present bearings and the lined strips can be formed into shells after lining instead of being lined after forming, as is necessary in the case of heavy, thick bearings. The structure of the babbitt, both in uniformity and grain size improves with thinner layers, as there is less segregation due to better and more accurate cooling with thin layers than is possible with thick layers.

Other advantages derived from the lightness of the stock are the increased speed and ease of handling all through the manufacturing operations, the operators being able to mount the bearings in position and remove the same very much more rapidly than in the case of heavier articles, while the fatigue of the operator is correspondingly reduced. These same advantages continue through all the manufacturing operations, including the testing, packing and shipping, as well as in the assembling of the bearings in the housings in which they are to be used. The thinner section permits either the use in the same case of a heavier shaft, allows more strength to be built into the case if the same size shaft is retained, or permits the housing to be made smaller, thus saving material cost. Tolerances in parting line height can be greater because the sheet metal in the thickness employed by applicants can be crushed or pressed circumferentially to a desired fit and hence an inaccuracy of several thousandths of an inch in this dimension of each shell is of little consequence.

Our bearings are formed or stamped and the advantages resulting from this characteristic are found partly in the finished article and partly in the cost and ease of manufacture as contrasted with the methods employed for making heavy, rigid half bearings. The number of operations are greatly reduced as the flat blanks are stamped in a minimum number of operations to the desired finished form and size, and at this stage the shells include the desired flare or spread which permits them to be retained in the housing and cap.

One of the most important of the advantages derived from the use of a stamped shell is the precision which can be secured in the back of such an article. This precision arises of course partly from the nature of the material, since thin sheet metal is compact, dense and finished to a fairly close degree of accuracy in the manufacturing operations to which it is subjected, and also because of its thinness and flexibility the rolling, forming and compressing operations herein referred to act to produce a finished precision shell as regards its outer surface which is of extreme accuracy and can if desired be held to extremely close limits of thickness. A formed or stamped precision surface makes it unnecessary to machine or grind this portion of the bearing and the shell therefore retains the predetermined spread and dimensions given it in the coin-pressing and upsetting operation, which is not always the case if the surface layer of the metal is removed, as this disturbs the internal equilibrium and sometimes the shells open unequal amounts which cannot be allowed for accurately in any finishing operation. By reason of these operations the outer surface of the formed shell is undisturbed either by machining, grinding or by the removal of metal, and the surface of the strip which has been formed into the shell is similarly undisturbed except by reason of the plastic flow of the metal which occurs during the forming or coin-pressing operations. The use of a thin strip permits of working with coils, as already explained, and hence allows the bearing material to be poured onto the strip as a continuous operation instead of being cast onto individual units, as is the usual practice.

As already stated, our bearings are exact, interchangeable precision bearings, which have a uniform wall thickness throughout the entire area, except for the relieved portions, which varies less than one-thousandth of an inch over the entire shell and is ordinarily accurate to one-half or one-quarter or one-thousandth of an inch. This accuracy and interchangeability permit half shells to be interchanged with, and to be used with, any other half shell of the same size and type, greatly facilitating the use and assembly of the bearings in the housings when manufactured, and being even more important in the replacement of such bearings in the field. The interchangeability of the half shell is of great importance in connecting rods, in which ordinarily the bearing surface consists of a lining of babbitt which is cast into the shell. Upon failure of the lining in one type of connecting rod it is exchanged for another rod already lined, and as these rods are ordinarily not exact as to weight and balance the substitution of a new rod for the one removed frequently affects the smoothness of balance of the motor, while the delay incidental to the exchange of one rod for a new one keeps the motor out of service for a considerable period. In some few instances removable bearings are used in connecting rods, but such bearings are never interchangeable half for half, but at the best are machined and used in pairs and must therefore be handled and assembled in pairs or their accuracy is lost. Such bearings are ordinarily thick cast bronze lined with babbitt, which are expensive to manufacture, and in most cases require hand finishing, such as scraping, when assembled in a rod. In connecting rods our bearings can be interchanged half-for-half, and there is therefore no necessity either for maintaining large stocks of rods about the country for any given motor, nor is there any difficulty or skill required for removal of the bearings which have failed or worn and in substituting our bearings therefor.

While we have hereinbefore indicated the advantages of our flexible type of bearing as a precision bearing, we recognize the fact that there are some manufacturers who do not use precision bearings, but who do use what are known in the trade as line reamed bearings. This latter type of bearing is assembled in the case and finished to the prescribed limits by a final reaming or boring operation. Consequently, the limits imposed upon the bearing manufacturer are wider in the latter case than in the case of precision bearings. It will be manifest that our method not only lends itself to manufacture of bearings which are to be subsequently finished in place but, because of the features of flexibility and conformability, permit of an even greater variation in the limits to which the case must be held.

Summarizing as briefly as possible the characteristics and advantages of our new bearings, we find that our bearings consist of dense, tough, compact light sheet metal, having a uniform, smooth, accurate precision undisturbed outer surface without the necessity of any finishing operation which involves removal of any part of the stock, absolute precision limits as regards total wall thickness to within less than one-thousandth of an inch, an improved babbitt structure in which the babbitt has been compressed and strengthened by the forming operations, and finally a flexibility which can ordinarily be determined manually which facilitates all of the operations involved in the manufacture of the bearings and permits the bearings to be set into engagement with the wall of the supporting housing, such as to permit the entire strength of the housing to act upon and lend its rigidity to the bearing, while permitting the bearing, when required, to yield with the stressing imposed upon it by the operation of the shaft. At the same time this same yieldability or flexibility of the shell permits the bearings to be fitted with a substantial circumferential compression of each shell, which causes the bearings to be set back into the complete contact with the housing wall which is required, while permitting, if desired, greater tolerances in the circumferential length of each bearing and securing these vitally important results with the available pressure in the cap bolts, to a degree unattainable with any of the heavy, rigid bearings heretofore employed.

It is difficult to set up any exact thickness below which the advantages explained above are secured and above which these advantages are not secured. While it is probably possible to determine by exhaustive tests or by calculation the maximum limits as regards thickness which permits a given bearing to possess the major portion of the advantages and economies referred to above, we find that for all practical purposes bearings of ordinary size as regards width and length will possess the advantages and economies referred to if they are manually flexible, which we have found to be apparently a substantially accurate rough test which may be given such bearings.

Other modes of applying the principle of our invention may be employed instead of the one explained, change being made as regards the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. A bearing of the character described comprising a thin flexible composite shell having an undisturbed outer surface of predetermined contour and uniform smoothness, and of such thickness and such flexibility under light pressure that said shell is capable of being brought into intimate contact substantially all over its outer surface with an enclosing housing upon assembly therein.

2. A bearing of the character described, comprising a thin, manually flexible, semi-cylindrical, composite metal shell and said bearing being of such thickness and of such flexibility, that said shell is capable of being brought into intimate contact substantially all over its outer surface with a rigid enclosing housing upon assembly therein.

3. A bearing of the character described, comprising a thin, flexible, semi-cylindrical sheet metal shell lined with bearing material, said shell having an undisturbed outer surface of predetermined contour and uniform smoothness and being of such thickness and flexibility, that said shell is capable of being brought into intimate contact substantially all over its outer surface with an enclosing housing upon assembly therein.

4. A bearing of the character described, comprising a semi-cylindrical shell of sheet steel lined with a bearing material, said shell having its undisturbed back formed to a predetermined contour and uniform smoothness, and said shell being sufficiently thin and flexible to be forced into engagement substantially all over its outer surface against a rigid housing upon assembly therein.

5. A bearing of the character described, comprising a thin, manually flexible semi-cylindrical composite shell of greater initial diameter than the housing in which said bearing is intended for use and having a smooth undisturbed outer surface, and of such thickness and flexibility that said bearing is capable of being initially manually sprung into engaging contact with the housing in which it is to be used and is capable of being brought into intimate contact substantially all over its outer surface with the enclosing housing upon final assembly therein without deformation of said bearing surface beyond the permissible tolerance for said bearing in use.

6. A bearing of the character described, comprising a thin, composite, flexible shell having an initial diameter and circumferential length exceeding the desired final diameter and length, and of such thickness and flexibility that said bearing is capable of being brought by relatively light pressure into true circular form and substantially complete outer surface engagement with the wall of a rigid enclosing housing upon assembly therein.

7. A bearing assembly of the character described, comprising a housing, and a removable cap therefor, two thin, flexible, composite, semi-cylindrical bearings mounted in the opening formed by said housing and cap, said bearings being of such thickness and flexibility, that when so assembled they are capable of being forced into a substantially uniform and flexing engagement substantially all over their outer surfaces with the walls of said housing and cap by a safe fraction of the pressure of assembly of said cap upon said housing.

8. In a bearing assembly of the character described, the combination with a housing, and a removable cap therefor, said housing and cap when assembled defining a cylindrical opening therethrough adapted to receive two semi-cylindrical shaft supporting bearings; of two thin, flexible, composite, approximately semi-cylindrical bearings, said bearings having a conjoint circumferential length when initially assembled in cap and housing exceeding the circumferential length of the inner walls of said cap and housing, and said bearings being of such thickness and flexibility that final assembly of said cap upon said housing forces and flexes said bearings into an intimate contact substantially all over their outer surfaces with the walls of said housing and cap, and decreases the circumferential length of said bearings to the circumferential length of the walls of said housing and cap.

9. In a bearing of the character described, the combination with a housing, and a removable cap therefor, said housing and cap when assembled defining a cylindrical opening therethrough adapted to receive two semi-cylindrical shaft supporting bearings; of two thin, flexible, approximately semi-cylindrical bearings, each consisting of a sheet steel shell lined with bearing material, said bearings having a diameter across their parting line edges exceeding that of said cap and housing, and a conjoint circumferential length when initially assembled in cap and housing exceeding the circumferential length of the inner walls of said cap and housing, and said bearings being of such thickness and flexibility that relatively light manual pressure will force them initially into said cap and housing, and that a safe fraction of the final assembly pressure will force and flex said bearings into an intimate contact substantially all over their outer surfaces with the walls of said cap and housing, and decrease the circumferential length of said bearings to that of the inner walls of said cap and housing.

10. In a bearing assembly, the combination with a housing and removable cap therefor, said housing and cap defining a cylindrical opening therethrough; of two thin, flexible bearings, each formed of a sheet steel shell lined with bearing material, said bearings being of greater diameter across their parting line edges and of greater circumferential length than the diameter and circumferential length of the walls of said cap and housing, respectively, said two bearings being initially mounted and engaged in said housing and cap, respectively, and said bearings being of such thickness and flexibility that they are capable of being forced and flexed into an intimate contact substantially all over their outer surfaces with the walls of said housing and cap, and of having their excess circumferential length reduced to that of said cap and housing walls upon final assembly of said cap and housing about said bearings.

Signed by us, this 31st day of December, 1931.

BENJAMIN F. HOPKINS.
JOHN V. O. PALM.